US011770379B1

(12) United States Patent
Grubin

(10) Patent No.: US 11,770,379 B1
(45) Date of Patent: *Sep. 26, 2023

(54) PROXY SERVICE FOR TWO-FACTOR AUTHENTICATION

(71) Applicant: Amazon Technologies, Inc., Seattle, WA (US)

(72) Inventor: Benjamin Philip Grubin, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,348

(22) Filed: Jun. 13, 2022

Related U.S. Application Data

(63) Continuation of application No. 16/588,792, filed on Sep. 30, 2019, now Pat. No. 11,363,021.

(51) Int. Cl.
| | |
|---|---|
| *H04L 9/08* | (2006.01) |
| *H04L 9/40* | (2022.01) |
| *H04L 9/32* | (2006.01) |

(52) U.S. Cl.
CPC ............ *H04L 63/0884* (2013.01); *H04L 9/08* (2013.01); *H04L 9/3271* (2013.01); *H04L 63/20* (2013.01); *H04L 2463/082* (2013.01)

(58) Field of Classification Search
CPC ..... H04L 63/0884; H04L 9/08; H04L 9/3271; H04L 63/20; H04L 2463/082
See application file for complete search history.

(56) References Cited

U.S. PATENT DOCUMENTS

| | | | | |
|---|---|---|---|---|
| 11,363,021 | B1 * | 6/2022 | Grubin | ...................... H04L 9/08 |
| 2005/0021975 | A1 * | 1/2005 | Liu | ..................... H04L 63/0281 |
| | | | | 713/182 |
| 2014/0093084 | A1 * | 4/2014 | De Atley | ................ G06F 21/64 |
| | | | | 380/277 |
| 2014/0189808 | A1 * | 7/2014 | Mahaffey | ................ G06F 21/31 |
| | | | | 726/4 |
| 2014/0282936 | A1 * | 9/2014 | Fitzgerald | ........... H04L 41/0806 |
| | | | | 709/221 |
| 2015/0358161 | A1 | 12/2015 | Kancharla et al. | |
| 2015/0358294 | A1 | 12/2015 | Kancharla et al. | |
| 2016/0149877 | A1 | 5/2016 | Kancharla et al. | |
| 2020/0092284 | A1 | 3/2020 | Zhu et al. | |

OTHER PUBLICATIONS

Nist, "Implementation Guidance for FIPS PUB 140-1 and the Cryptographic Module Validation Program," Jan. 10, 2002, 63 pages.
Nist, "Implementation Guidance for FIPS PUB 140-2 and the Cryptographic Module Validation Program," Initial Release Mar. 28, 2003, 205 pages.

* cited by examiner

*Primary Examiner* — Baotran N To
(74) *Attorney, Agent, or Firm* — Davis Wright Tremaine LLP

(57) ABSTRACT

The present disclosure relates to two-factor authentication with a Hardware Security Module (HSM). In response to a login attempt, the HSM indicates that two-factor authentication is required. To generate the second authentication factor, a management console is accessed using credentials. The management console generates the second authentication factor and provides the second authentication factor to the client. The client then provides the second authentication factor to the HSM to complete the two-factor authentication operations.

20 Claims, 7 Drawing Sheets

US 11,770,379 B1

PROXY SERVICE FOR TWO-FACTOR AUTHENTICATION

BACKGROUND

Maintaining the security of computer systems is a difficult problem. One way that computer systems are secured, is through the use of cryptography. Cryptographic systems rely on cryptographic keys to protect information. In many situations the security of the cryptographic keys is of high importance because access to the cryptographic keys allows access to the data that is being protected. However, in cloud computing environment where the physical location of computer systems maintaining cryptographic keys is often times outside of the customer's possession the security of computer systems is even more challenging. Specifically, cloud services make it convenient for customers to provision resources as needed without large investments in hardware. Hardware Security Modules (HSMs), even if hosted in the cloud computing environment, provide hardware protection of cryptographic secrets such that even the cloud provider hosting the HSM cannot obtain the secrets. However, this combination makes it very cumbersome for the cloud provider to integrate use of the HSM with other cloud services for the customer.

BRIEF DESCRIPTION OF THE DRAWINGS

Various techniques will be described with reference to the drawings, in which.

DETAILED DESCRIPTION

Figure 1:
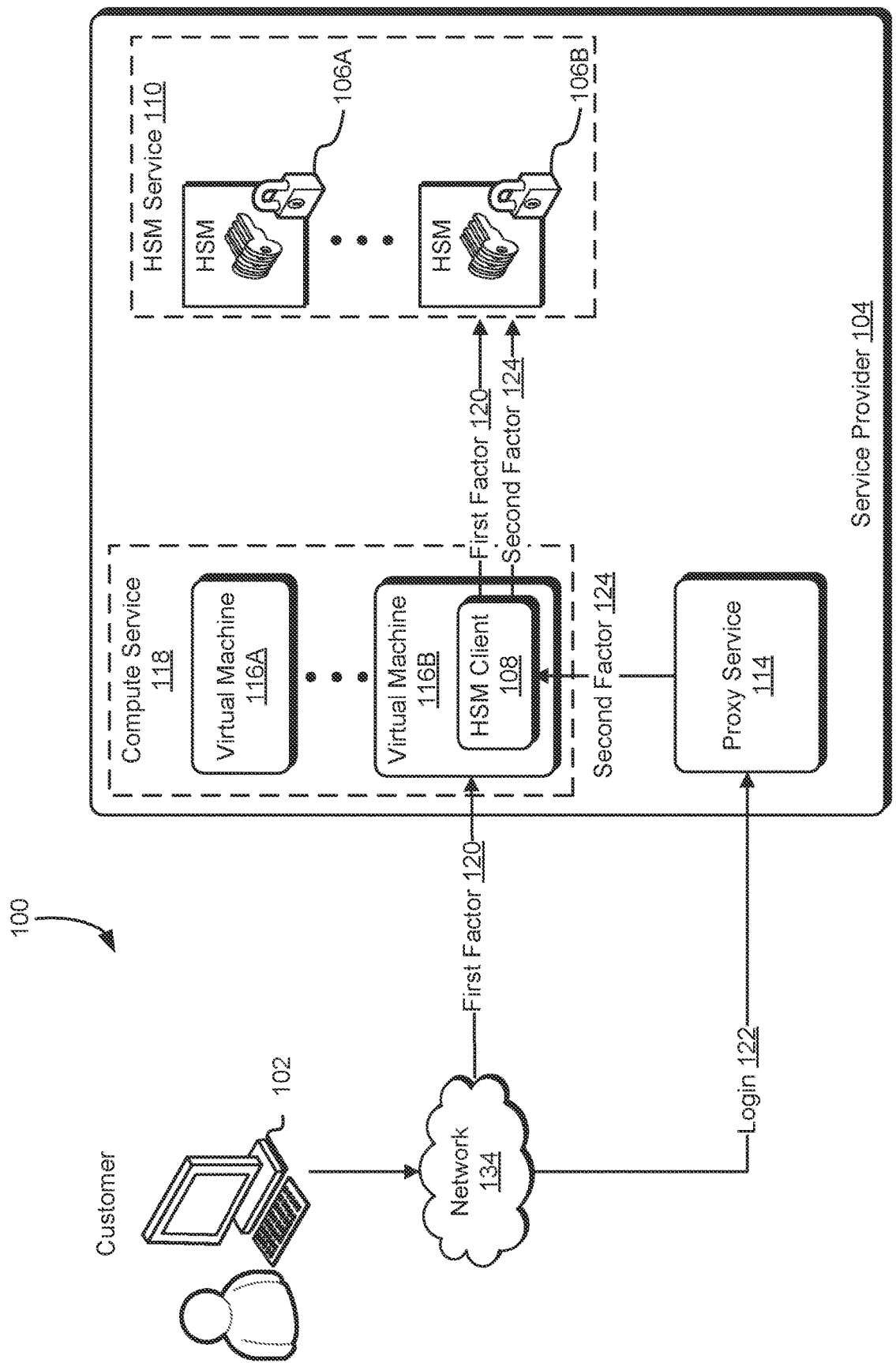
FIG. 1 shows an illustrative example environment for utilizing two-factor authentication, provided through a management console, between a client device and a hardware security module (HSM)

The present disclosure describes techniques for presenting a client of a hardware security module (HSM) provided by an HSM service of a computing resource service provider, with increased security and ease of use by providing a mechanism for utilizing two-factor authentication with the HSM. In general, a cryptographic module such as an HSM may be used to perform cryptographic operations such as encrypting data, decrypting data, and generating cryptographic keys. Cryptographic keys may include information that may be used as part of one or more cryptographic algorithms. Furthermore, clients leverage the computing resources of the computing resource service provider, including both physical and virtual HSMs provided by the computing resource service provider.

However, in computing resource service provider environments using two-factor authentication with an HSM, it can be difficult as there is often no efficient and/or simple way to communicate the second factor to the HSM. For example, a client utilizing a virtual machine to communicate with an HSM provided by the computing resource service provider does not have access to a Universal Serial Bus (USB) port or other physical interface of the virtual machine to provide a second factor during authentication with the HSM. The present disclosure solves this and other problems by providing a proxy service (e.g., through a management console of the computing resource service provider) that can emulate various second factors for use during authentication operations.

A client of the computing resource service provider and/or HSM service, in various examples, enables two-factor authentication with a particular HSM. For example, the client generates a policy indicating that two-factor authentication is required and causes the HSM service to apply the policy to the client's HSMs and/or client accounts managed by the computing resource service provider. In addition, the client provides the HSM with a public key to allow the HSM to verify the second factor when provided. In some examples, the computing resource service provider generates the public and private key pair and associates the private key with the client account so that the second factor authentication token may be generated using the private key when requested by the client.

Once the HSM has the public key associated with the client, two-factor authentication may be used when logging in or otherwise causing the HSM to perform an operation. The client, in various examples, initiates the two-factor authentication procedure by transmitting a command to the HSM using an HSM client application. The HSM client application may provide credential (e.g., username and password) to the HSM. In response, the HSM indicates that two-factor authentication is required. For example, the policy associated with the client account indicates that two-factor authentication is required for operations involving the HSM. In response, the client application may begin polling or otherwise requesting the second factor from the management console of the computing resource service provider.

In various examples, in order to obtain the second factor, the client establishes a connection with the management console and authenticates to the management console (e.g., provides a username and password). As described in greater detail below, the management console may provide a user interface that allows the client to perform various management operations in connection with computing resources provided to the client by the computing resource service provider. For example, the management console, in response to the HSM client application polling or otherwise requesting the second factor, provides the client with a button or other graphical user interface element that, when selected by the client, causes the management console to generate the second factor. As described in greater detail below, the management console may use the private key associated with the client to digitally sign a token code, one-time passcode, or other data, and provide the digitally signed data to the HSM client application. The HSM client application, in various examples, then provides the HSM with the second factor for authentication. The HSM may then use the public key provided by the client to verify the second factor and, if verified, provide the client with access to the HSM.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a customer 102 connects with an HSM 106B, provided by an HSM service 110 of a service provider 104, using two-factor authentication. As illustrated by FIG. 1, the customer 102 interacts the HSM 106B through a virtual machine 116B, executing an HSM client 108 and provided by a compute service 118 of the service provider 104. As a result, the customer 102 does not have direct physical access to the virtual machine 116B and the physical hardware (e.g., server computer systems in a data center) executing the virtual machine 116B. As a result, the customer 102 is unable to use various forms of two-factor/multi-factor authentication as described in the present disclosure. For example, the customer 102 is unable to access physical interfaces of the server computer system executing the virtual machine to provide a token for use as a second factor in two-factor authentication. However, in various embodiments described in greater detail below, the proxy service 114 provides emulation of a second factor 124 after the customer 102 has provided a first factor 120 for authentication to the HSM 106B. In various embodiments, the HSM client 108 includes source code or other executable code that, when executed by the virtual machine 116B, provides an interface to one or more HSMs such as the HSM 106B. As described in greater detail below, the HSM client application 108 allows the customer 102 to login to the HSM 106B and cause the HSM 106B to perform various cryptographic operations.

The customer 102 may, through an application programming interface (API), request computing resources from the service provider 104 such as the virtual machines 116A and 116B and the HSMs 106A and 106B. Furthermore, the customer 102 and other entities described in the present disclosure (e.g., the virtual machine 116B), through the API, may also interact with various other entities (e.g., a management console described in greater detail below) and perform various functions. For example, as described in greater detail below, the virtual machine 116B and/or HSM client 108 utilizes an API to poll the proxy service 114 to obtain the second factor 124. Furthermore, customers such as the customer 102 shown in FIG. 1 may be any entity operable to access the service provider 104, and may include remote clients that connect to the service provider 104 via a network 134 or may include internal customers—for example, a computing device operated by the customer and computing resources of the service provider 104 may be hosted on the same physical hardware (e.g., using virtual machines 116A and 116B). The network 134 may be any appropriate network, including an intranet, the Internet, a cellular network, a local area network, a satellite network, or any other such network and/or combination thereof. The virtual machines 116A and 116B are provided by the compute service 118 which manages the life-cycle and interactions with the virtual machines 116A and 116B.

The service provider 104 may include or have access to components, modules, libraries, or other executable code that operates as a frontend system and backend system. In some embodiments, the frontend system may comprise executable code, software components, hardware components, or any combination thereof that is distributed among one or more computer systems, for example in a distributed system. An example frontend system may be a web server operable to receive API requests or a fleet of web servers operable to receive API requests. In an embodiment, a service frontend system receives a request from the customer 102 and communicates with one or more virtual machines and HSMs, such as the virtual machine 116B and/or HSM 106B shown in FIG. 1. The virtual machines 116A and 116B, in various embodiments, include computing resources supported by physical hardware through a hypervisor or other mechanism for virtualization. The virtual machines 116A and 116B may also include container instances, such as Docker®, executed by a single operating system kernel.

The management console, described in greater detail below in connection with FIGS. 4 and 5, may be exposed to the customer 102 as a user interface (e.g., a graphical user interface displayed in an application executed on a computing device of the customer 102) and enable interaction with various entities illustrated in FIG. 1. For example, the customer 102, through the management console, requests instantiation of the virtual machine 116B, in response the management console transmits a command to the compute service 118 that, upon receipt by the compute service 118, causes the compute service 118 to instate the virtual machine 116B. Furthermore, the management console can be used to configure topics for which the customer 102 seeks to receive notifications, configure applications (or people, users, roles, policies, etc. . . . ), subscribe customer 102 to the topics, publish messages, or configure delivery of the messages over customers' protocol of choice (i.e., hypertext transfer protocol (HTTP), e-mail, and short message service (SMS), among others). A notification service (not shown in FIG. 1 for simplicity) may provide notifications using a "push" mechanism without the need to periodically check or "poll" for new information and updates. For example, when awaiting the second factor 124 the virtual machine 116B and/or HSM client 108 may poll the notification service to determine if the proxy service 114 has generated the second factor 124. In other examples, the notification service pushes the second factor 124 to the virtual machine 116B and/or HSM client 108 once the second factor 124 has been generated. The notification service may further be used for various purposes such as monitoring applications executed by the compute service 118 and/or HSM service 110. For example, the notification service notifies the virtual machine 116B and/or HSM client 108 that the second factor 124 is required to complete authentication to the HSM 106B. In an embodiment, the management console is provided by a set of computing devices (e.g., server computer systems) that execute source code or other executable code that causes the set of computing devices to perform the various operations described in the present disclosure.

The service provider 104, in various embodiments, provides a variety of services to the customer 102, and the customer 102 may communicate with the service provider 104 through service calls transmitted over the network 134 to an interface (not shown in FIG. 1), which may be a web service interface or any other type of customer interface. Although only the compute service 118 and HSM service 110 are shown in FIG. 1, the service provider 104 provides a variety of services to the customer 102. Furthermore, each service may have its own interface and, generally, subsets of the services may have corresponding interfaces in addition to or as an alternative to a single interface for the service provider 104.

In an embodiment, the customer 102 is an organization that may utilize one or more of the services provided by the service provider 104 to maintain and deliver information and/or applications (e.g., services) to various entities, which may be located in various geographical locations. In yet other embodiments, the customer 102 includes individuals who utilize the services of the service provider 106 for remote application execution. In general, the customer 102 may include a variety of different entities including individuals, organizations, departments, work groups, service providers, computing resource providers, applications, services, computer systems, micro services, or anything else capable of interacting with the services provided by the service provider 104. For example, the customer 102 may include a plurality of users assigned one or more roles, where the roles are associated with a policy that indicates two-factor authentication is required when accessing HSMs (e.g., the HSM 106B) of the HSM service 110.

In various embodiments, the customer 102, as part of the creation and initialization of the HSM 106B generates cryptographic material used during authentication operations with the HSM 106B. For example, the customer 102 causes (e.g., through API calls to the management console) generation of a public and private key pair, user credentials, tokens, and/or other information used during authentication operations with the HSM 106B. In various embodiments, the public key is provided to the HSM 106B for verification of the second factor 124 and the private key is maintained in a database or other data structure by the proxy service 114 or a key management service (not shown in FIG. 1 for simplicity). The key management service may provide generation, storage, and utilization of symmetric and asymmetric cryptographic keys. In yet other embodiments, the private key is maintained by the proxy service 114 and used to generate the second factor 124 when requested by the customer 102.

Furthermore, one or more HSMs provided by the HSM service 110 may implement cryptographic module interfaces that are in accordance with the security requirements for standards such as the most recent version of Federal Information Processing Standard (FIPS) Publication 140 which is incorporated into this document by reference. The HSMs may incorporate FIPS 140 compliant security functions and may encrypt data according to the FIPS standard, such as the FIPS 140-2 standard.

The HSMs 106A and 106B of the HSM service 110, in various embodiments, are implemented as hardware, software, or a combination thereof. Each HSM of HSM service 110 includes information that may be used by the HSM (e.g., HSMs 106A and 106B) to perform cryptographic operations such as encrypting data, decrypting data, and generating cryptographic keys, and further includes information used in the context of performing operations in connection with the two-factor authentication described in the present disclosure. For example, the HSM 106B provided by the HSM service 110 includes cryptographic material used to verify the first factor 120 and/or the second factor 124. The cryptographic material may be implemented as a symmetric key or as an asymmetric key pair. In one example, the second factor 124 includes a response to a challenge encrypted with the private key associated with the customer 102, and the HSM 106B verifies the response by at least decrypting the response with the pubic key associated with the private key stored in the HSM 106B. Variations of such a system are also contemplated herein—for example, instead of or in addition to encrypting data in the manner described above, a message authentication code (MAC) over the data is generated and transmitted to the HSM 106B. In such examples, the MAC may be received by the HSM 106B and is used to ensure the authenticity (i.e., verify the sender of the message) and integrity (i.e., the message was not modified after it was sent) of the received data.

Although two-factor authentication is described in detail, multi-factor authentication can be used in connection with various embodiments described in the present disclosure. For example, the proxy service 114 may emulate any number of additional authentication factors and/or multi-factor authentication tokens. In another example, the customer 102, through the HSM client application, provides the first factor 120 and an additional factor (e.g., a PIN), customer 102 then obtains the second factor 124, and provides the second factor 124 to the HSM 106B as described above. In addition, the proxy service 114 may emulate a variety of different two-factor authentication tokens and/or protocols. Two-factor authentication tokens that may be emulated and used in connection with various embodiments described in the present disclosure include, for example, RSA SecurID® token, YubiKey® token, software tokens, disconnected tokens, connected tokens, mobile phones, or other devices capable of providing two-factor authentication. In various embodiments, the proxy service 114 maintains the two-factor and/or multi-factor authentication token on behalf of the customer 102 and/or user associated with the customer 102.

As illustrated in FIG. 1, the customer 102 provides the first factor 120 to the virtual machine 116B. The first factor 120, in various embodiments, includes credentials or other information identifying the customer 102 and/or a particular user associated with the customer 102. Furthermore, the virtual machine 116B may execute the HSM client 108 that enables the virtual machine 116B to interact with the HSM 106B. The HSM client 108, for example, includes executable code or other instructions that provide an interface for transmitting commands and obtaining data generated as a result of the HSM 106B executing the commands. In an embodiment, the customer 102 operates the virtual machine 116B through a user interface and causes the virtual machine to execute the HSM client 108, and then provides credentials to the HSM client for use in authenticating to the HSM 106B. In addition, the HSM client 108 may provide a network connection or other connection to the HSM 106B.

The virtual machine 116B, through the HSM client 108, may provide the first factor 120. In response, the HSM 106B may determine whether two-factor authentication is enabled for the particular set of credentials provided. For example, the HSM 106B includes a policy that indicates particular users of the customer 102 and/or credentials that require two-factor authentication. In an embodiment, as a result of the HSM 106B determining that two-factor authentication is required, the HSM 106B provides to the virtual machine 116B (or HSM client 108 executed by the virtual machine 116B) an indication that the two-factor authentication is required. As described above, in an embodiment, the virtual machine 116B then polls or otherwise attempts to obtain the second factor 124 from the management console. Furthermore, a notification may be provided to the customer 102 to indicate that the second factor 124 is required to access the HSM 106B.

As described in greater detail below in connection with FIG. 5, the management console, in response to the request from the virtual machine 116B for the second factor, provides a user interface element to allow the customer 102 to request the second factor 124 from the proxy service 114. For example, when the customer 102 performs a login 122 operation to the proxy service 114, the management console, or otherwise authenticates to the service provider 104 (e.g., through a browser, service call, API, or service provider application), a user interface element (such as a button) is provided to the customer 102 that, when interacted with by the customer 102, causes proxy service 114 to generate the second factor 124. In various embodiments, the second factor 124 is generated in response to the customer 102 authentication (e.g., providing valid credentials) to the service provider 104 and/or particular service of the service provider 104 (e.g., the proxy service), in order to authorize the proxy service 114 to generate a response based at least in part on a multi-factor authentication token. Furthermore, the login 122 to the service provider 104 may include single-factor authentication or multi-factor authentication.

In an embodiment, the proxy service 114 generates an API call to the key management service and, in response, the key management service provides the proxy service 114 with the second factor 124. For example, the API call to the key management service includes a challenge obtained from the HSM 106, which is then signed with a private key associated with credentials provided during the login 122 to the proxy service 114. In yet other embodiments, the proxy service 114 generates the second factor 124. Once the second factor 124 is generated, the proxy service 114 provides the second factor 124 to the virtual machine 116B and/or the HSM client 108, for example, in response to the virtual machine 116B polling a "get second factor" API provided by the management console and/or proxy service 114. Once the second factor 124 is obtained, in various embodiments, the virtual machine 116B provides the second factor 124 to the HSM 106B. In response, the HSM 106B verifies the second factor 106B and allows the customer 102 to access or otherwise login to the HSM 106B.

Although HSMs are used in various embodiments the systems, methods, and processes described in the present disclosure may be used in connection with the performance of multi-factor authentication to other devices and/or applications. For example, the proxy service 114 can provide multi-factor authentication to a virtual private network service/application. In addition, although the HSM 106B and proxy service 114 are provided by the service provider 104, the proxy service 114 and the device the customer 102 is using multi-factor authentication to authenticate to (e.g., the HSM 106B), in various embodiments, is provided by two or more distinct service providers. For example, the service provider 104 provides the proxy service 114 to the customer 102 and an HSM service (distinct from the service provider 104) provides the customer with the HSM 106B.

Figure 2:
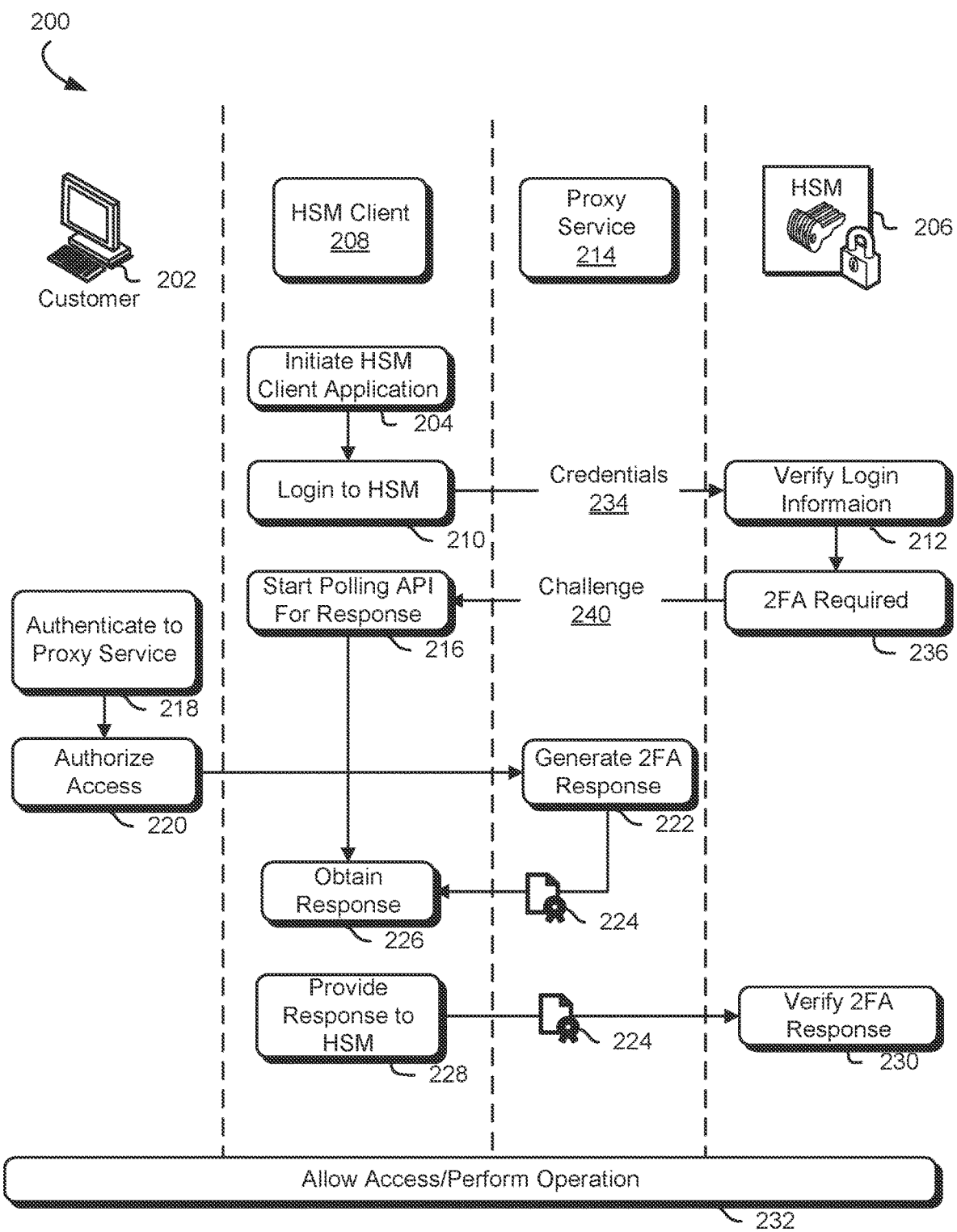
FIG. 2 shows an illustrative example of a messaging diagram between a client device, a management console, and an HSM for utilizing two-factor authentication.

FIG. 2 shows a messaging diagram 200 for authenticating, by a customer 202, to an HSM 206 using two-factor authentication where the second factor is emulated by a proxy service 214. The customer 202 includes various entities as described above that interact with and utilize computing resources of a computing resource service provider to perform various functions including cryptographic operations using the HSM 206. The proxy service 214 includes various computing systems that provide a user interface to the customer 202 to perform various operations described in the present disclosure. The HSM 206 may include an HSM as described in greater detail above in connection with FIG. 1.

As illustrated in FIG. 2, the process of two-factor authentication with the HSM 206, in various embodiments, begins when the customer 202 initiates 204 an HSM client 208, for example, by at least causing a virtual machine to execute the HSM client 208. As described above, the customer 202 may operate a virtual machine or other computing resource that is remote to the customer 202 and provided by the computing resource service provider. The HSM client 208, in various embodiments, include executable code that enables a computing device operated by the customer 202 to communicate with and/or provide commands to the HSM 206. In step 210, the HSM client 208 logs in to the HSM 206 using credentials provided by the customer 202. The login operations, as illustrated in FIG. 2, include providing credentials 234 to the HSM 206. The credentials 234 may include any data or other information useable to authenticate the customer 202 such as a username, password, one-time password, PIN, code, token, and/or combination thereof. For example, the credential may include a username and password associated with a user account of the customer 202.

In step 212, the HSM 206 verifies the login information. Returning to the example above, the HSM 206 verifies that the username and password combination match information associated with user information maintained by the HSM 206. If the HSM 206 is unable to verify the credentials 234, the HSM 206 may return an error. However, if the credentials 234 are verified the HSM 206 may determine if two-factor authentication is required 236. As described in greater detail below in connection with FIG. 3, the HSM 206, in various embodiments, maintains a policy or other information indicating whether two-factor authentication is required for the particular user associated with the credentials 234. For example, the customer 202 during a setup operation with the HSM 206 indicate users and/or credentials that are enabled for two-factor authentication. In other embodiments, the HSM 206 may require two-factor authentication of all users.

In step 216, in response to the notification from the HSM 206 that two-factor authentication is required 236, the HSM client 208 polls a "get second factor" API provided by the proxy service 214. In various embodiments, the HSM client 208 may periodically or aperiodically poll the proxy service 214 to determine if a second factor authentication token 224 is available to provide to the HSM 206. In step 218, the customer 202 logs in to the proxy service 214 or otherwise authenticates to the service provider. In one example, as described in greater detail below in connection with FIG. 4, the customer 202 through a web browser or other application may connect to a management console that provides access and/or management of the proxy service 214. In step 220, the customer 202 requests the second factor authentication token 224. For example, the proxy service 214 causes a button to be displayed by the customer 202 that, when interacted with, causes the proxy service 214 to generate the second factor authentication token 224. In step 220, once the customer 202 has authenticated to the proxy service 214, the customer 202 authorizes access to the HSM 206. In various embodiments, the customer 202 authorizes access for a particular user or user account which may include the customer 202 or other entity.

In step 222, proxy service 214 generates the second factor authentication response 224. In various embodiments, the proxy service 214 generates the second factor authentication response 224 by at least digitally signing a challenge 240 provided by the HSM 206. For example, in step 236, as part of indicating that two-factor authentication is required, the HSM 206 provides the challenge 240 to the HSM client 208. The HSM client 208, in various embodiments, provides the challenge 240 to the proxy service through an API call or other service call. As described in the present disclosure, the proxy service 214 may emulate a variety of different two-factor authentication tokens and/or other authentication information used during two-factor authentication operations. In step 226, the customer 202 obtains the second factor authentication response 224. As described above, the HSM client 208 continues polling the API provided by the proxy service 214, and once the customer 202 authorizes the proxy service 214 to generate the second factor authentication response 224, the API is updated and the second factor authentication response 224 is provided to the HSM client 208 in response.

In step 228, the HSM client 208 provides the second factor authentication response 224 to the HSM 206. In step 230, the HSM 206 verifies the second factor authentication response 224. In various embodiments, the HSM 206 verifies the second factor authentication response 224 using the public key associated with the private key used to digitally sign the challenge 240 in order to generate the second factor authentication response 224. If the second factor authentication response 224 is successfully verified, the HSM 206 may allow access and/or perform cryptographic operations 232 on behalf of the customer 202. However, if the second factor authentication response 224 is not successfully verified the HSM 206 may deny access and notify the customer 202.

Figure 3:
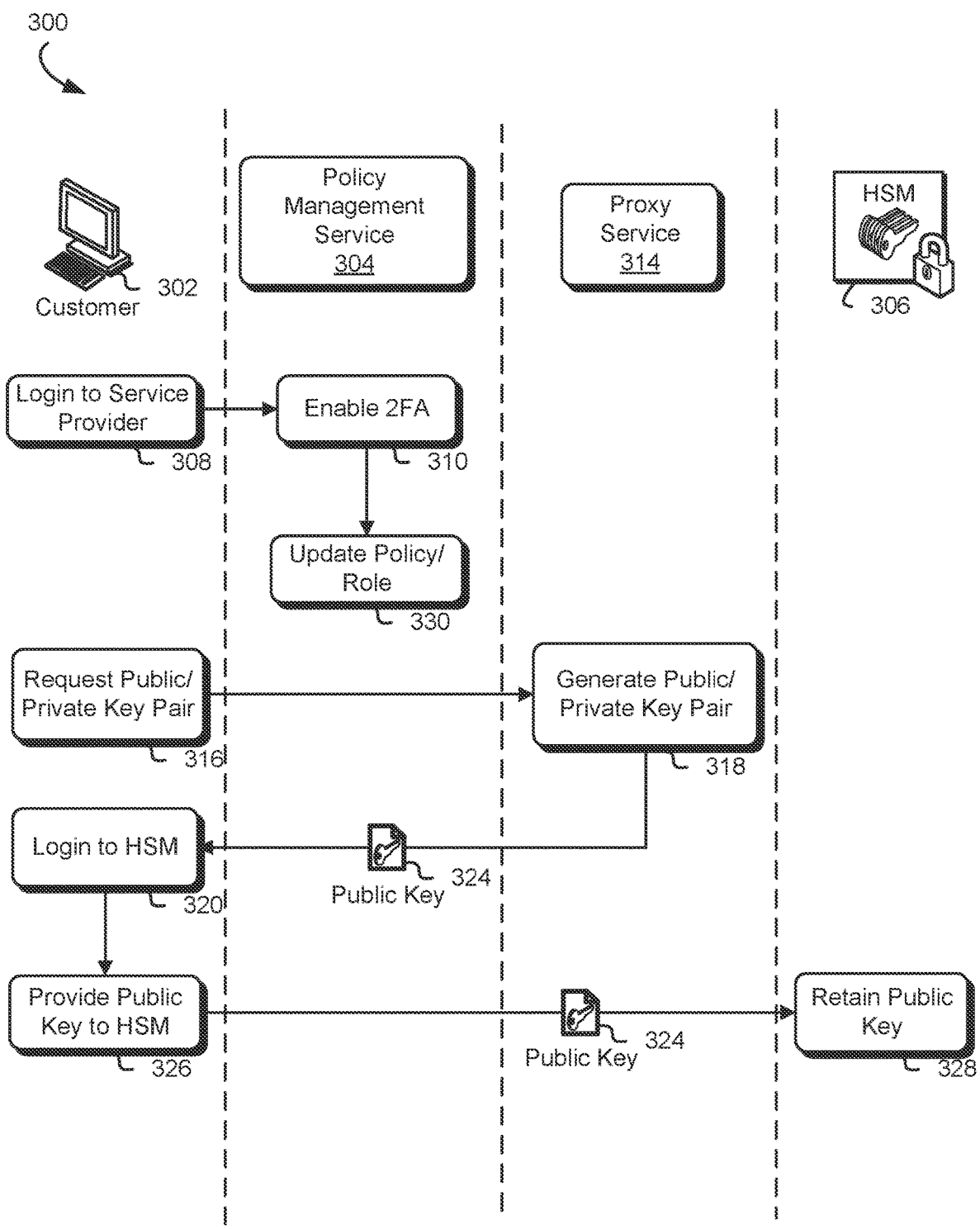
FIG. 3 shows an illustrative example of a messaging diagram between a client device, a management console, and an HSM for utilizing two-factor authentication.

FIG. 3 shows a messaging diagram 300 for enabling an HSM 306 to perform two-factor authentication when performing cryptographic operations on behalf of a customer 302. The customer 302 includes various entities as described above that interact with and utilize computing resources of a computing resource service provider to perform various functions including cryptographic operations using the HSM 306. A policy management service 304 includes various computing systems that provide a user interface to the customer 302 to create, edit, or otherwise manage policies, roles, and user accounts, as well as perform various operations described in the present disclosure. For example, the policy management service 304 comprises a set of computing resources provided by the computing resource service provider that enforce polices on various computing resources operated by the customer such as the HSM 306. Furthermore, in various embodiments, a management console provides the customer 302 with access to computing resources (e.g., the policy management service 304) through a set of API calls generated in response to the customer 302 interacting with a website. The HSM 306 may include an HSM as described in greater detail above in connection with FIG. 1.

In step 308, the customer 302 logs in to the policy management service 304. As described in greater detail below in connection with FIG. 4, the customer 302 through a web browser or other application may connect to the management console. The policy management service 304, in various embodiments, enables the customer 302 to interact with various services of the computing resource service provider. For example, the management console enables the customer 302 to interact with the policy management service 304 of the computing resource service provider. In step 310, the customer 302 indicates that two-factor authentication is enabled. In various embodiments, the customer 302 indicates that two-factor authentication is enabled for a particular user and/or role associated with the customer 302. The indication that two-factor authentication is enabled may be recorded in a policy or other information associated with the customer 302. In addition, in the various embodiments where two-factor authentication is associated with a particular user and/or role, the policy indicating two factor authentication is required also indicates that the customer 302 is authorized to access the "get second factor" API described in greater detail above.

In step 330, the policy management service 304 updates the policy and/or role information as indicated by the customer 302. In various embodiments, this includes the customer 302 transmitting an API call to the policy management service 304 that maintains policy and role information on behalf of the customer 302 and provides the policy and role information to other services of the computing resource service provider to control the customer's 302 access to the other services. In step 316, the customer 302 requests a public and private key pair for use during two-factor authentication with the HSM 306. In other embodiments, the policy management service 304 generates the public and private key pair in response to the customer 302 indicating that two-factor authentication is enabled for the HSM 306. Furthermore, in an embodiment, the customer 302 and/or the policy management service 304 requests the public and private key pair from a key management service provided by the computing resource service provider. In addition, the key management service may maintain the private key in a secure location for use to generate the second authentication factor as described above (e.g., digitally signing a challenge provided by the HSM 306).

In step 318, a proxy service 314 (or the key management service in response to a request from the proxy service) generates the public and private key pair and provides the public key 324 to the customer 302. As described above, the public key 324 enables the HSM 306 to verify the second factor. Although, the public key 324 from an asymmetric key pair is described in connection with the embodiments illustrated in FIG. 3, any cryptographic material usable to verify the second factor may be used in connection with the embodiments described in the present disclosure. For example, a symmetric key may be generated and provided to the HSM 306 for use in verifying the second factor.

Returning to FIG. 3, in step 320, the customer 302 logs in to the HSM, for example, through the HSM client described above. In addition, the customer 302 may maintain an administrator account associated with the HSM 306. In various embodiments, the administrator account allows the customer 302 to create, edit, delete, or otherwise modify the user account associated with the HSM 306. In step 326, the customer 302 provides the public key 324 to the HSM 306. For example, through the HSM client the customer 302 copies the public key 324 to the HSM 306. After providing the public key 324 to the HSM 306, the customer 302 may delete the public key 324. In step 328, the HSM 306 retains the public key for use during two-factor authentication operations.

Figure 4:
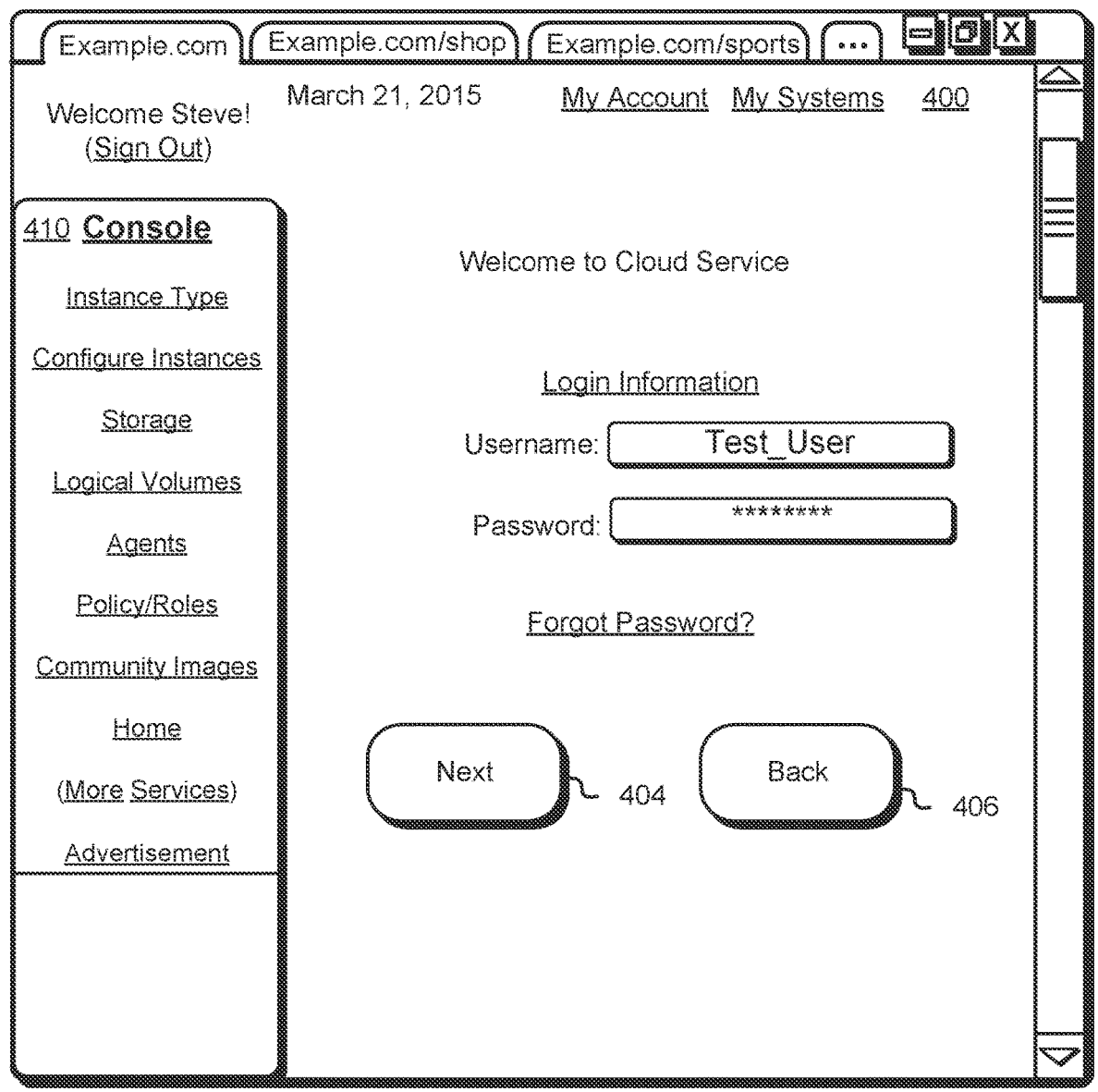
FIG. 4 shows an illustrative example of a management console presented in a user interface of a client device.

FIG. 4 shows a webpage 400 which may be displayed by an application executed by a computing system enabling a client to interact with various services operated by the computing resource service provider in accordance with an embodiment. As illustrated in FIG. 4, the webpage 400 includes various graphical user interface elements that enable the client to indicate information associated with the two-factor authentication setting through a management console of which the webpage 400 is a part. In various embodiments, the client interacts with the various service by issuing commands through the management console. For example, the client communicates with a compute service, an HSM service, a key management service, and/or various other services described in the present disclosure. The webpage 400 may be displayed by various applications, such as a mobile application or web browser. In this example, the webpage 400 includes various navigational features.

For instance, on the left-hand side of the webpage 400, various links 410 may link to one or more other webpages that contain additional content corresponding to a variety of different actions the client may cause to be performed. For example, the link "Configure Instances," when selected by the client using an input device, causes the computing device displaying the webpage 400 to transmit a request for a webpage associated with the link. As described in greater detail below, the client, through the management console, may interact with the key management service to generate a second factor to be provided to an HSM that requires two-factor authentication based at least in part on a policy associated with the HSM and/or the client. As described above, the client may log in to the management console to cause the management console or other service of the computing resource service provider to generate an authentication token. For example, as illustrated at FIG. 4, the client is presented with text boxes and/or text fields to enter login information. The login information, as illustrated in FIG. 4, includes a username and password associated with the client. As a result of providing the login information, the management console verifies the login information provided and if valid, allows the client to access the management console web pages.

The management console web pages may correspond to operations that may be taken to manage or otherwise control computing resources provided by the compute service or other computing services of the computing resource service provider. In this example, the links appear as textual words which enable the links to be selected using an appropriate input device such as a keyboard, mouse, touchscreen, or other input device. Selection of one of the links 410 may cause an application displaying the webpage 400 to submit, pursuant to a Uniform Resource Locator (URL) associated with the selected link by the programming of the webpage 400, a request, such as an HTTP request, for the content associated with the link to a server that provided the webpage 400 or another server.

In this example, the webpage 400 also includes a graphical user element configured as a "next" button 404. The next button 404 may be a graphical user interface element of the webpage 400 where the underlying code of the webpage 400 is configured such that selection by an input device of the next button 404 causes login information entered into the webpage 400 to be transmitted to the computing devices providing the management console. Furthermore, through the management console, the client may be guided through the process of establishing two-factor authentication for an HSM, update and/or modify policy and/or role information, generate public and private key information, and/or other operations described in the present disclosure. The process may be divided into steps and the user may be prompted to provide information at each step. For example, the webpage 400 displays to the user a list of different HSMs and different user accounts that do not have two-factor authentication enabled.

The webpage 400 may also include a graphical user element configured as a "back" button 406. The back button 406 may be a graphical user interface element of the webpage 400 where the underlying code of the webpage 400 causes the application displaying the webpage 400 to transmit a command to the computing systems to return to a previously navigated webpage of the management console.

Once the user has made a selection using the webpage 400 and selected the next button 404, the application displaying the webpage 400 may submit a request, such as an HTTP request, to the management console to verify the login information. In various embodiments, the management console maintains a database of login information and associated client accounts. The login information may be transmitted to one or more servers of the management console operated by the computing resource service provider. Furthermore, the management console may obtain additional information from one or more other services in order to verify the login information obtained from the client. Alternatively, once the user selection has been made, using the webpage 400 and selecting the next button 404, the application displaying the webpage 400 may submit a request, such as an HTTP request, to a web service frontend or other interface that may translate the request to a service call or API command and forward the command to the compute service.

The management service may, in response to the client selecting the next button 404 with an input device, verify the login information and update the webpage 400 to display additional information to the client, for example, the webpage 500 described in greater detail below in connection with FIG. 5. In various embodiments, the management console or other service of the computing resource service provider returns, in response to the request, such as an HTTP request, from the client, an indication that the login information has been verified.

Figure 5:
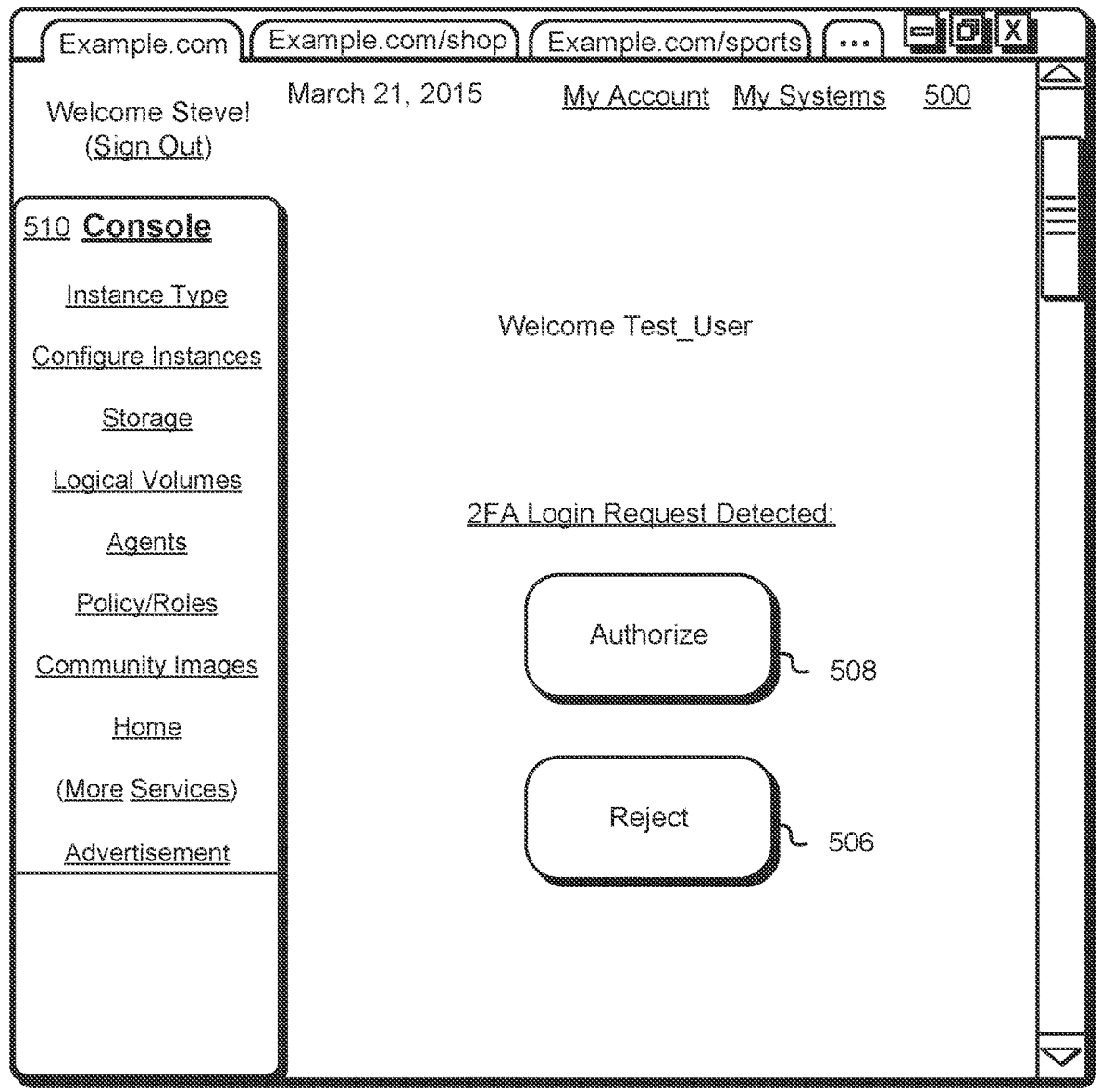
FIG. 5 shows an illustrative example of a management console presented in a user interface of a client device.

FIG. 5 shows a webpage 500 which may be displayed by an application executed by a computing system enabling a client to interact with various services operated by the computing resource service provider in accordance with an embodiment. As illustrated in FIG. 5, the webpage 500 includes various graphical user interface elements that enable the client to perform two-factor authentication through a management console of which the webpage 500 is a part. In various embodiments, the client interacts with the various services by issuing commands through the management console. For example, the client communicates with a compute service, an HSM service, a key management service, and/or various other services described in the present disclosure. The webpage 500 may be displayed by various applications, such as a mobile application or web browser. In this example, the webpage 500 includes various navigational features.

For instance, on the left-hand side of the webpage 500, various links 510 may link to one or more other webpages that contain additional content corresponding to a variety of different actions the client may cause to be performed. For example, the link "Policy/Roles," when selected by the client using an input device, causes the computing device displaying the webpage 500 to transmit a request for a webpage associated with the link. As described in greater detail below, the client, through the management console, may interact with the key management service to generate a second factor to be provided to an HSM, through an HSM client application executed by computing resources operated by the client, that requires two-factor authentication based at least in part on a policy associated with the HSM and/or the client. As illustrated in FIG. 5, once the client has logged in to the management console, the webpage 500 displays a user interface element (a "generate token" button) that allows the client to complete two-factor authentication with the HSM.

The management console web pages may correspond to operations that may be taken to manage or otherwise control computing resources provided by the compute service or other computing services of the computing resource service provider. In this example, the links appear as textual words which enable the links to be selected using an appropriate input device such as a keyboard, mouse, touchscreen, or other input device. Selection of one of the links 510 may cause an application displaying the webpage 500 to submit, pursuant to a Uniform Resource Locator (URL) associated with the selected link by the programming of the webpage 500, a request, such as an HTTP request, for the content associated with the link to a server that provided the webpage 500 or another server.

In this example, the webpage 500 also includes a graphical user element configured as an "authorize" button 508. The authorize button 508 may be a graphical user interface element of the webpage 500 where the underlying code of the webpage 500 is configured such that selection by an input device of the authorize button 508 causes a request to generate an authentication response to be transmitted to the computing devices responsible for generating the authentication response. As described above, the proxy service and/or key management service may generate the authentication response. For example, the HSM client may transmit a challenge from the HSM to the proxy service, in response to the customer selecting the authorize button 508. The proxy service, in some embodiments, causes the key management service to digitally sign the challenge with a private key associated with the customer and/or login information provided as described above in connection with FIG. 4.

The webpage 500 may also include a graphical user element configured as a "reject" button 506. The reject button 506 may be a graphical user interface element of the webpage 500 where the underlying code of the webpage 500 causes the application displaying the webpage 500 to transmit an indication to the proxy service that the attempted access is not authorized. Furthermore, the authorization displayed in FIG. 5, in various embodiments, is for a specific operation and/or for a specific interval of time. For example, the authorization is provided for a particular user to login to a particular HSM and is valid for an interval of time (e.g., 5 minutes).

Figure 6:
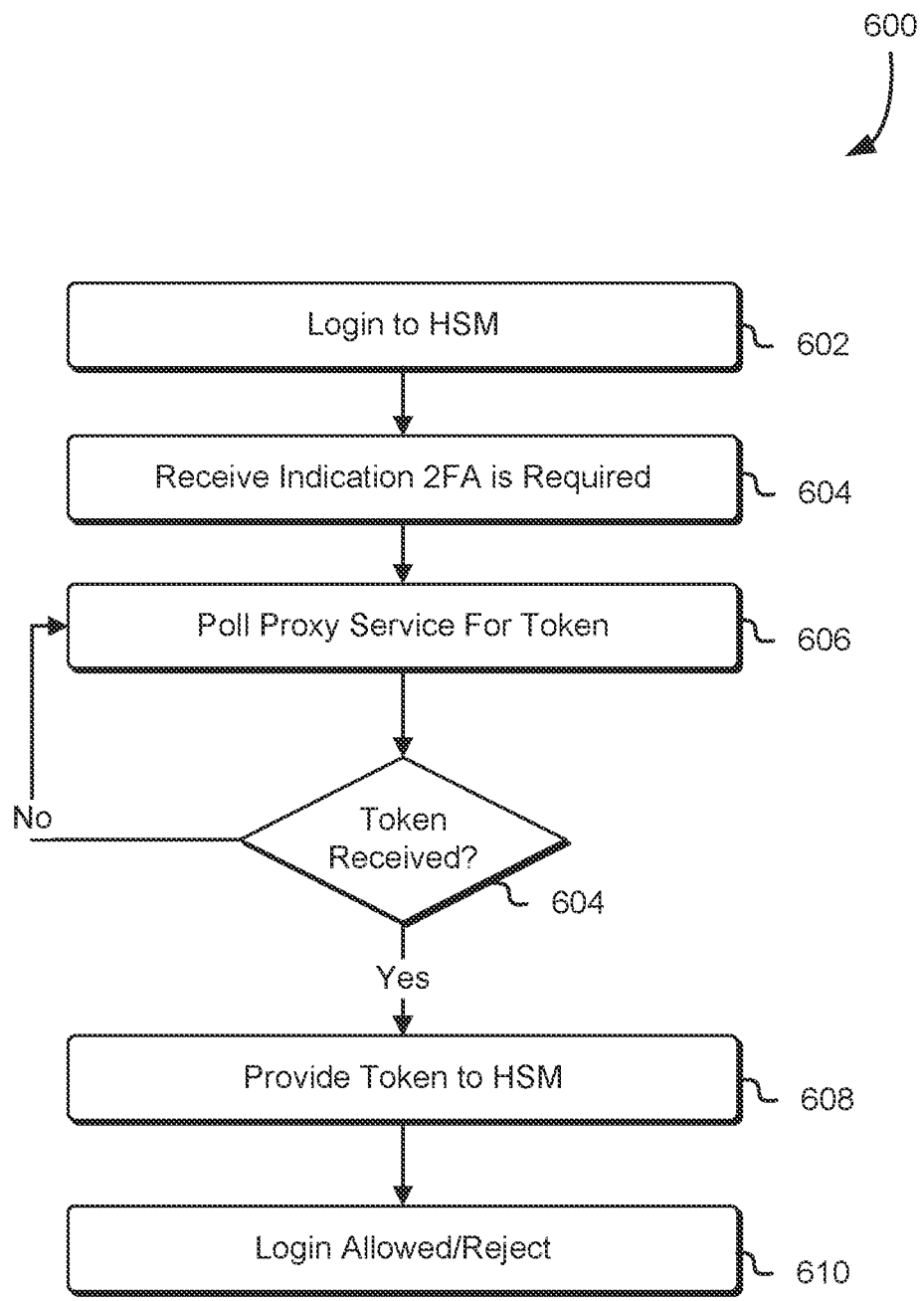
FIG. 6 shows an illustrative example of a process for utilizing two-factor authentication to execute a command on an HSM.

FIG. 6 is a block diagram illustrating an example of a process 600 for performing two-factor authentication with an HSM in accordance with at least one embodiment. Some or all of the process 600 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 600 may be performed by any suitable system, such as a server in a data center, by various components of the environment 100 described in conjunction with FIG. 1, such as the virtual machine 116B, by multiple computing devices in a distributed system of a computing resource service provider, or by a service provided by a computing resource service provider. The process 600 includes performing login operations with an HSM 602. As described above, an HSM client application may be executed by the system executing the process 600 and may provide an interface for interaction with the HSM. For example, the HSM client application allows the system executing the process 600 to provide the HSM with commands to perform various cryptographic operations. In step 604, the system executing the process 600 receives an indication that the two-factor authentication is required. In various embodiments, a policy associated with a client and/or user account indicates that two-factor authentication is required. Furthermore, the HSM may maintain various user accounts and each user account may be associated with a policy and/or a group of users may be associated with a single policy.

In step 606, the system executing the process 600 polls the management console for a second authentication factor, for example, an authentication token. As described above, API may be provided to enable the system executing the process 600 to obtain the second factor. Furthermore, the second factor, in various embodiments, is emulated by the management console in response to the client logging into the management console and issuing a command to generate the second token. If the second factor is unavailable, the system executing the process 600 continues to poll the management console. In an embodiment, the system executing the process 600 continues to poll the management console periodically or aperiodically for an interval of time (e.g., 2 minutes). If no response is received during the interval of time the system executing the process 600 may return an error. However, if the second factor is received, the system executing the process 600 continues to step 608.

In step 608, the system executing the process 600 provides the second factor to the HSM. In various embodiments, the HSM client application transmits the second factor over a network connection to the HSM. If the second factor is valid and verified by the HSM an indication may be provided to the HSM client application. In various embodiments, no indication is provided and the HSM client application is simply provided a result and/or response to a command provided to the HSM along with the login information provided in step 602. Returning to FIG. 6, in step 610, the system executing the process 600 receives an indication from the HSM whether the login is allowed or rejected. Note that one or more of the operations performed in steps 602-610 may be performed in various orders and combinations, including in parallel. In numerous variations to the process 600, one or more of the operations in steps 602-610 may be omitted or performed by other systems or services. For example, in embodiments where the second factor is provided, once generated the system executing the process 600 may omit step 606 and not poll the management console and instead wait for the second factor to be provided.

As one skilled in the art will appreciate in light of this disclosure, certain embodiments may be capable of achieving certain advantages, including some or all of the following: increasing security of computer systems such as HSMs and cloud HSMs by emulating various two-factor and multi-factor authentication tokens for use in distributed computing environments.

Figure 7:
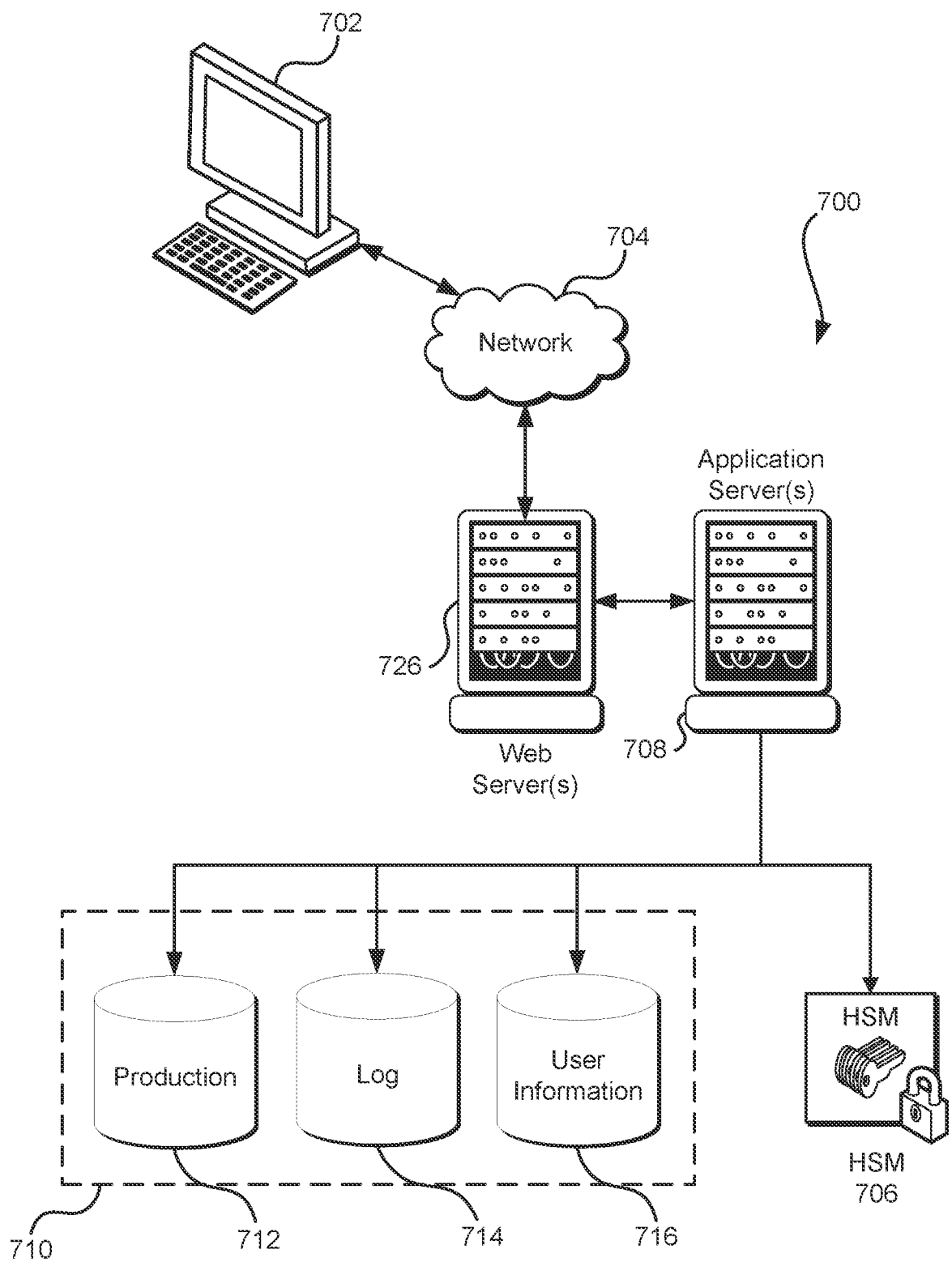
FIG. 7 illustrates a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network, or any other such network, and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, and the system includes a web server 726 for receiving requests and serving content in response thereto, although for other networks an alternative device serving a similar purpose could be used as would be apparent to one of ordinary skill in the art.

In an embodiment, the illustrative system includes at least one application server 708 and a data store 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered system. Data stores, in an embodiment, communicate with block-level and/or object-level interfaces. The application server can include any appropriate hardware, software, and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video, and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language. In an embodiment, operations described herein as being performed by a single device are performed collectively by multiple devices that form a distributed and/or virtual system.

The data store 710, in an embodiment, includes several separate data tables, databases, data documents, dynamic data storage schemes, and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis, or other such purposes. In an embodiment, other aspects such as page image information and access rights information (e.g., access control policies or other encodings of permissions) are stored in the data store in any of the above-listed mechanisms as appropriate or in additional mechanisms in the data store 710.

The data store 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

The application server 708, in an embodiment, utilizes an HSM 706, provided by an HSM service as described above, to perform various cryptographic operations. Furthermore, through the application server, the customer may interact (e.g., through an HSM client) with the HSM 706 and may use various components described in FIG. 7, to perform a variety of operations described in the present disclosure to perform two-factor authentication operations with the HSM 706.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting the scope of the disclosure.

The various embodiments further can be implemented in a wide variety of operating environments, which in some cases can include one or more user computers, computing devices, or processing devices that can be used to operate any of a number of applications. In an embodiment, user or client devices include any of a number of computers, such as desktop, laptop, or tablet computers running a standard operating system, as well as cellular (mobile), wireless, and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems, and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers, or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) is to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein is merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    obtaining an indication to use multi-factor authentication for a user to log in to a hardware security module (HSM) hosted by a computing resource service provider;
    generating an asymmetric key pair associated with the user;
    causing the HSM to obtain a public key of the asymmetric key pair usable to verify a response for the multi-factor authentication; and
    responsive to an interface associated with the computing resource service provider obtaining a set of credentials of the user to log in the HSM, provide the HSM with the response, where the response is generated based at least in part on a challenge and a private key of the asymmetric key pair.

2. The computer-implemented method of claim 1, wherein the computer-implemented method further comprises storing the private key in a secure location.

3. The computer-implemented method of claim 1, wherein causing the HSM to obtain the public key of the asymmetric key pair further comprises providing the public key to a client device of the user, the public key usable by the HSM to verify the response as a result of the public key being provided to the HSM from the client device of the user via an interface to the HSM.

4. The computer-implemented method of claim 1, wherein the computer-implemented method further comprises:
    generating a policy associated with the HSM and the user, where the policy indicates that a client device of the user can transmit an application programming interface (API) call to use the multi-factor authentication; and
    providing the policy to the HSM.

5. A system, comprising:
    one or more processors; and
    memory that stores computer-executable instructions that are executable by the one or more processors to cause the system to allow a client device of a user to gain access to a hardware security module (HSM) hosted by a first service using multi-factor authentication, by at least:
        causing a second service to generate a private key and a public key, where the private key is usable to generate a response based at least in part on signing a challenge issued by the HSM to perform the multi-factor authentication; and
        causing the HSM to obtain the public key, where the public key is usable to verify the response sent to the HSM.

6. The system of claim 5, wherein the first service and the second service are provided by different computing resource service providers.

7. The system of claim 5, wherein the computer-executable instructions that allow the user to gain access to the HSM further include computer-executable instructions that cause the system to:
    obtain a set of credentials associated with a user to log in to the second service; and
    authenticate the user to the second service using the set of credentials.

8. The system of claim 5, wherein the computer-executable instructions that allow the user to gain access to the HSM further include computer-executable instructions that cause the system to cause an interface of the HSM to poll the second service to obtain the response.

9. The system of claim 5, wherein the computer-executable instructions that cause the system to allow the client device of the user to gain access to the HSM further include computer-executable instructions that cause the system to provide a client device of the user a graphic user interface to perform the multi-factor authentication through the second service.

10. The system of claim 9, wherein the graphic user interface displays a one or more buttons to complete the multi-factor authentication with the HSM.

11. The system of claim 5, wherein the private key and the public key are associated with the user.

12. The system of claim 5, wherein the second service is a management console.

13. A non-transitory computer-readable storage medium storing thereon executable instructions that, as a result of being executed by one or more processors of a computer system, cause the computer system to:
    in response to a first request from a user, generate a cryptographic key to perform multi-factor authentication to log in to a cryptographic device;
    in response to a second request from the user to login to the cryptographic device, generate a response based at least in part on a challenge obtained from the cryptographic device and the cryptographic key; and
    provide the response to the cryptographic device as part of the login to the cryptographic device.

14. The non-transitory computer-readable storage medium of claim 13, wherein the cryptographic key is a symmetric key and usable for the cryptographic device to verify the response.

15. The non-transitory computer-readable storage medium of claim 13, wherein the first request includes a change in a policy to allow a set of credentials associated with the user to be used for the multi-factor authentication.

16. The non-transitory computer-readable storage medium of claim 13, wherein the response is an authentication token.

17. The non-transitory computer-readable storage medium of claim 13, wherein the second request includes a first set of credentials and a second set of credentials different from the first set of credentials.

18. The non-transitory computer-readable storage medium of claim 17, wherein the instructions to generate a response in response to the second request further comprise instructions that, as a result of being executed by the one or more processors, cause the computer system to:
   obtain, using the first set of credentials, an indication that the multi-factor authentication is required to log in to the cryptographic device;
   in response to the indication, authenticate the second set of credentials; and
   generate a response based at least in part on signing the challenge by using the cryptographic key.

19. The non-transitory computer-readable storage medium of claim 13, wherein the cryptographic device is a hardware security module comprising an HSM client to initiate polling to obtain the response.

20. The non-transitory computer-readable storage medium of claim 13, wherein the instructions further comprise instructions that, as a result of being executed by the one or more processors, cause the computer system to provide, to a client device of the user, an indication that the log in to the cryptographic device is allowed.

* * * * *